(12) United States Patent
Aguera y Arcas (10) Patent No.: US 8,149,235 B2
(45) Date of Patent: Apr. 3, 2012

(54) SYSTEM AND METHOD FOR UPSCALING LOW-RESOLUTION IMAGES

(75) Inventor: Blaise Aguera y Arcas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 11/208,826

(22) Filed: Aug. 22, 2005

(65) Prior Publication Data

US 2006/0038823 A1 Feb. 23, 2006

Related U.S. Application Data

(60) Provisional application No. 60/603,160, filed on Aug. 20, 2004.

(51) Int. Cl.
*G06T 15/00* (2011.01)
(52) U.S. Cl. ........ 345/419; 345/420; 345/421; 345/422; 345/423; 345/440; 345/441; 345/443; 345/619
(58) Field of Classification Search .......... 345/419–423, 345/441
See application file for complete search history.

(56) References Cited

U.S. PATENT DOCUMENTS

| 5,847,711 | A * | 12/1998 | Kaufman et al. | 345/424 |
|---|---|---|---|---|
| 6,424,351 | B1 | 7/2002 | Bishop et al. | |
| 6,498,607 | B1 * | 12/2002 | Pfister et al. | 345/423 |
| 6,583,787 | B1 * | 6/2003 | Pfister et al. | 345/441 |
| 6,621,501 | B2 * | 9/2003 | Morrison | 345/660 |
| 6,744,435 | B2 * | 6/2004 | Zwicker et al. | 345/424 |
| 7,064,770 | B2 * | 6/2006 | Lachine et al. | 345/611 |
| 2003/0234791 | A1 | 12/2003 | Boyd et al. | |
| 2004/0012603 | A1 | 1/2004 | Pfister et al. | |
| 2004/0125103 | A1 * | 7/2004 | Kaufman et al. | 345/419 |
| 2006/0158451 | A1 * | 7/2006 | Barenbrug et al. | 345/582 |

OTHER PUBLICATIONS

Gaël Guennebaud, Loïc Barthe, Mathias Paulin, "Real-time Point Cloud Refinement", Eurographics Symposium on Point-Based Graphics, Jun. 2004, Zurich, Switzerland.*
Alexa M., Behr J., Cohen-OR D., Fleishman S., Levin D., Silva C. T.: "Computing and Rendering point Set Surface", IEEE Trans. on Visualization and Computer Graphics, Jan. 2003, vol. 9, No. 1, pp. 3-15.*
Guennebaud G., Paulin M.: "Efficient screen space approach for hardware accelerated surfel rendering", Proc. Of Vision, Modeling and Visualization Conf., Nov. 19-21, 2003, Munich, Germany, pp. 1-10.*
S. Rusinkiewicz and M. Levoy, "QSplat: A Multiresolution Point Rendering System for Large Meshes", SIGGRAPH 2000, New Orleans, LA, pp. 343-352.*
J. Meredith and K.-L. Ma, "Multiresolution view-dependent splat-based volume rendering of large irregular data", Proc. of IEEE Symposium on Parallel and Large Data Visualizsation and Graphics, 2001, pp. 93-100.*
X. Yuan, M. X. Nguyen, H. Xue and B. Chen, "Hybrid Forward Resampling and Volume Rendering", Proceedings of Volume Graphics, 2003. pp. 119-128.*

(Continued)

*Primary Examiner* — Jin-Cheng Wang
(74) *Attorney, Agent, or Firm* — Shook, Hardy & Bacon L.L.P.

(57) ABSTRACT

A method is disclosed which may include providing an original image having an array of samples; defining a two-dimensional target image having a higher resolution than the original image; defining a splat in the target image for each of a plurality of samples in the array; and rendering the plurality of splats employing a graphics processor.

5 Claims, 6 Drawing Sheets

OTHER PUBLICATIONS

J. Huang et al. "Edge Preservation in Volume Rendering Using Splatting", Proc. Of the 1998 IEEE symposium on Volume Visualization, 1998, p. 63-69.*

S. Siltanen, "Surface Splatting", Helsinki Univ. of Tech., Tik-111.5000 Seminar on Computer Graphics, Apr. 2004, p. 1-12.*

X. Yuan, et. al., "Hybrid Forward Resampling and Volume Rendering", Euro-graphics, 2003, pp. 1-9.*

Michael Gleicher; A Brief Tutorial on Interpolation for Image Scaling; Oct. 12, 1999; pp. 1-5; http://www.cs.wisc.edu/graphics/Courses/cs-638-1999/image_scaling.htm.

Graham Wihlidal; Box Filtering Height Maps for Smooth Rolling Hills; date posted Oct. 23, 2004; pp. 1-6; http://www.gamedev.net/reference/articles/article2164.asp.

* cited by examiner

SYSTEM AND METHOD FOR UPSCALING LOW-RESOLUTION IMAGES

CROSS-REFERENCE TO RELATED APPLICATIONS

This application the benefit of U.S. Provisional Patent Application Ser. No. 60/603,160, filed Aug. 20, 2004, entitled "Method for Rendering Low-Resolution Imagery Photorealistally", the entire disclosure of which is incorporated herein by reference.

BACKGROUND OF THE INVENTION

The present invention relates in general to the manipulation of computer images and in particular to a method for efficiently magnifying or "stretching" low-resolution images for display as high resolution images.

On conventional computer graphics hardware (which may include one or more graphics processors), raster images (i.e. rectangular arrays of pixel values typically representing brightness or color) can be interpolated bi-linearly for display at higher or lower resolution. For example, a 128×128 pixel image can be rendered at 96×96 pixels, which process may be referred to as "scaling down", "downsampling" or "minifying", or at 192×192 pixels, which process may be referred to as "scaling up", "upsampling", "stretching" or "magnifying". The original image's 128×128 pixels are generally referred to as "samples", so that the terms "pixel" and "pixels" may be reserved for the display elements. Hence, resampling can be interpreted as the conversion of original image samples to pixels whose spacing differs from the spacing of the original image samples.

In either case, color or brightness values "between pixels" may be estimated using an interpolation scheme. Bilinear interpolation is generally considered the simplest and most computationally efficient interpolation scheme that preserves the continuity of the interpolated image function. Thus, it is often used and, on many common graphics architectures, it is hardware-accelerated.

Figure 1A:
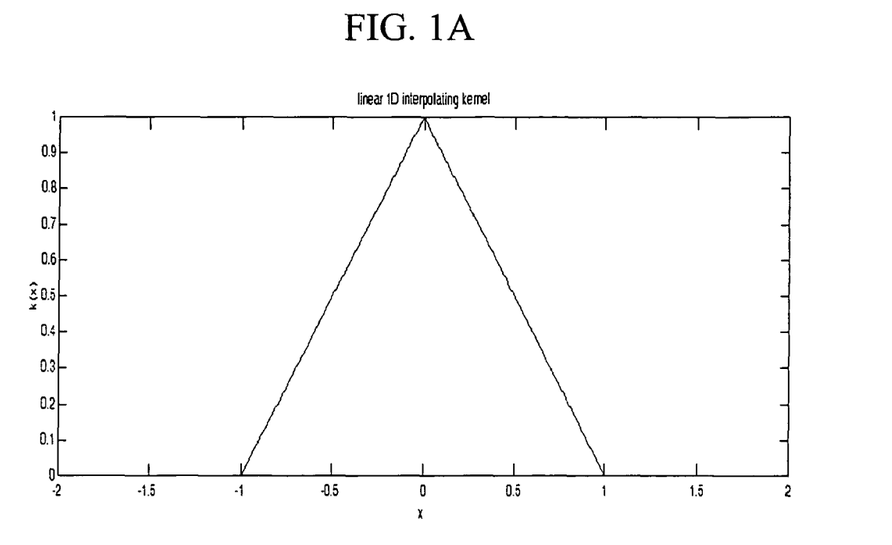
FIG. 1A is a plot of a conventional linear one-dimensional interpolating kernel.

Mathematically, linear interpolation of a discretely sampled function can be understood as convolution of the function with the linear interpolation kernel shown in FIG. 1A.

Figure 1B:
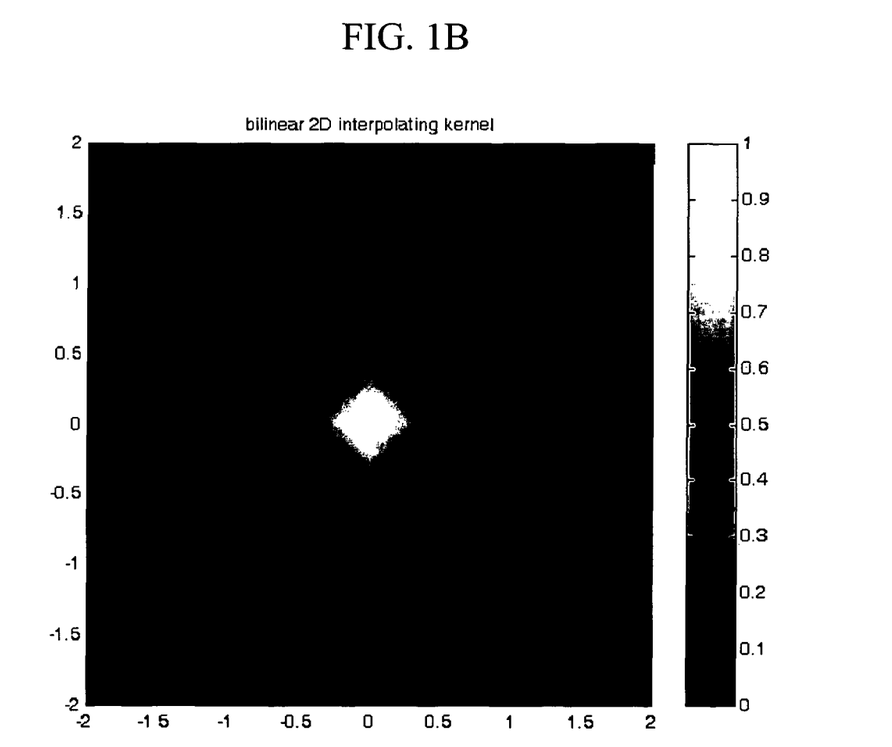
FIG. 1B is a plot of a conventional two-dimensional bilinear interpolating kernel along with a legend of grayscale values applicable to the plot.

The bilinear, two-dimensional kernel $k(x,y)$ is separable, and so constructed simply by multiplying one-dimensional linear kernels: $k(x,y)=k(x)*k(y)$ as illustrated in FIG. 1B.

It is noted that this bilinear kernel is usually considered adequate (on the basis of visually perceived subjective quality) for resampling two-dimensional photographic images, when the target resolution is not much greater than the original resolution. However, when an image is magnified substantially, for example, by a factor of more than about 4 on present-day computer displays, visual defects become apparent using existing methods. These defects are primarily related to the lack of continuity of the derivative of $k(x)$ (FIG. 1A), resulting in obvious "creasing" in the interpolated image wherever edges or other non-smooth features appear in the original image. This "creased" appearance is evident in the two-dimensional kernel $k(x,y)$ itself. Therefore, an improved method for upscaling images which does not experience the above-described creasing is needed.

SUMMARY OF THE INVENTION

According to one aspect, the invention provides a method, that may include providing an original image having an array of samples; defining a two-dimensional target image having a higher resolution than the original image; defining a splat in the target image for each of a plurality of samples in the array; and rendering the plurality of splats employing a graphics processor. Preferably, the plurality of samples for which the splats are defined are substantially only at or near edges of the original image. Preferably, the method further comprises rendering an interior of the target image using bilinear interpolation of an interior of the original image. Preferably, rendering the plurality of splats comprises calculating pixel values in the target image using a bicubic kernel.

Preferably, rendering the plurality of splats comprises calculating pixel values in the target image using a polynomial kernel. Preferably, rendering the plurality of splats comprises calculating pixel values in the target image using a kernel having a first-order or higher-than-first-order mathematical function. Preferably, rendering includes additively compositing texture images of the splats placed substantially at their respective original image sample centers and scaled by their respective image sample values.

Preferably, the compositing step further includes scaling each the texture image by a corresponding alpha value. Preferably, rendering the interior of the target image comprises: upsampling an interior of the original image to an intermediate image having a first resolution; and upsampling the intermediate image to provide the interior of the target image. Preferably the step of upsampling the intermediate image is performed using the graphics processor. Preferably the step of upsampling the intermediate image comprises using the intermediate image as a texture. Preferably, the method further comprises upsampling the original image by a first amount to provide an intermediate texture map.

Preferably, the method further comprises calculating fuzzy edges for the intermediate texture map. Preferably, the calculating step comprises employing bicubic resampling and an alpha channel for components of the fuzzy edges. Preferably, the method further comprises upsampling the intermediate texture map to provide the target image using the graphics processor. Preferably, if the intermediate texture map is static, the method may further include rendering the intermediate texture map at a plurality of continuously variable magnifications, thereby providing a plurality of upsampled images. Preferably, the method further includes forming a mipmap pyramid with the plurality of upsampled images, thereby providing a mipmap rendition. Preferably, the method further includes parametrically blending the mipmap rendition with the step of rendering of the plurality of splats.

According to another aspect, the invention provides an apparatus which may include a computing system having at least one CPU and at least one graphics processor, wherein the computing system is operable to: provide an original image having an array of samples; define a two-dimensional target image having a higher resolution than the original image; define a splat in the target image for each of a plurality of samples in the array; and render the plurality of splats employing the graphics processor. Preferably, the plurality of samples for which the splats are defined are substantially only at or near edges of the original image. Preferably, the computing system is further operable to render an interior of the target image using bilinear interpolation of an interior of the original image. Preferably, rendering the plurality of splats comprises calculating pixel values in the target image using a bicubic kernel. Preferably, rendering comprises additively compositing texture images of the splats placed substantially at their respective original image sample centers and scaled by their respective image sample values.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 2A:
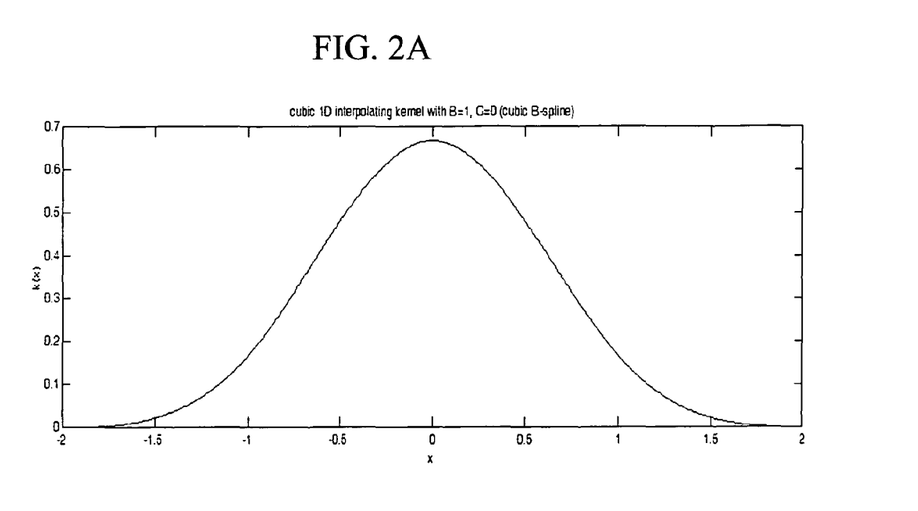
FIG. 2A is a plot of a conventional bicubic one-dimensional interpolating kernel.

To enhance interpolation quality, the bilinear kernel may be replaced with a cubic kernel based on a cubic $k(x)$, a mathematical representation of which is illustrated in FIG. 2A.

Resampling using a bicubic kernel can preserve continuity of both a function and its derivative; the support of the kernel increases to 4. Herein, the term "support" refers to the number of original image samples spanned by the kernel width. Cubics suitable for interpolation have the general form:
Where $0<=|x|<1$:

$$k(x)=((12-9B-6C)|x|^3+(-18+12B+6C)|x|^2+(6-2B))/6$$

Where $1<=|x|<2$:

$$k(x)=((-B-6C)|x|^3+(6B+30C)|x|^2+(-12B-48C)|x|+(8B+24C))/6$$

Figure 2B:
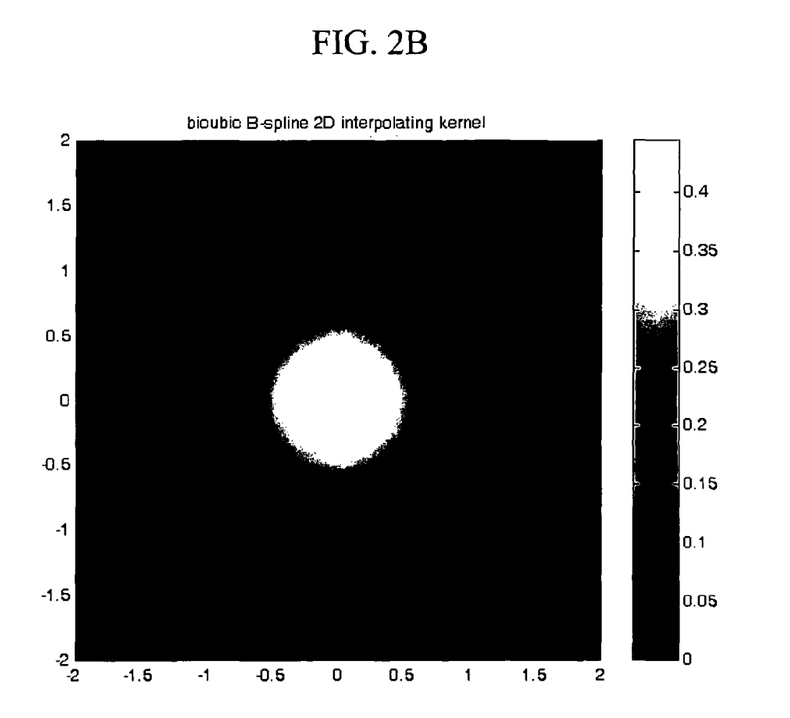
FIG. 2B is a plot of a conventional bicubic B-spline two-dimensional interpolating kernel along with a legend of grayscale values applicable to the plot.

Choosing B=1 and C=0, yields the one-dimensional B-spline plot of FIG. 2A, which is entirely nonnegative. (Note that other choices of B and C are possible, e.g. the Mitchell filter with B=⅓ and C=⅓, but these kernels have negative lobes.) As with the bilinear kernel of FIG. 1B, a separable 2D (two-dimensional) bicubic kernel $k(x,y)=k(x)*k(y)$ can be constructed, as shown in FIG. 2B. The kernel of FIG. 2B is clearly smoother and more circularly symmetric than the bilinear kernel of FIG. 1B.

Figure 3A:
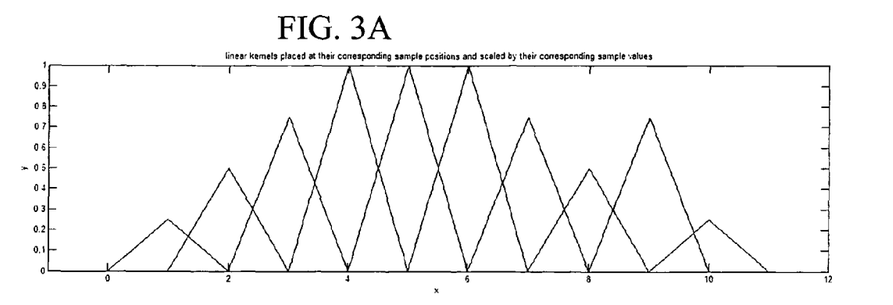
FIG. 3A is a plot of a plurality of linear kernels placed at corresponding sample positions and scaled by their corresponding sample values.
Figure 3B:
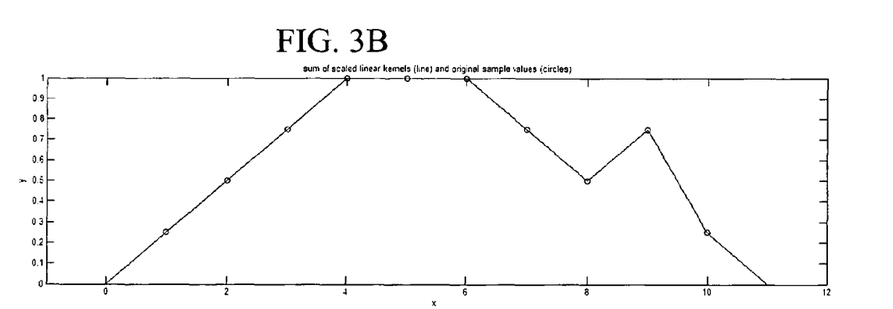
FIG. 3B is a plot of the sum of the linear kernels shown in FIG. 3A.

FIGS. 3A and 3B illustrate the effects of resampling the discrete function of Table 1 using linear kernels.

TABLE 1

| X | Y |
|---|---|
| 1 | 0.25 |
| 2 | 0.50 |
| 3 | 0.75 |
| 4 | 1.00 |
| 5 | 1.00 |
| 6 | 1.00 |
| 7 | 0.75 |
| 8 | 0.50 |
| 9 | 0.75 |
| 10 | 0.25 |

In one or more embodiments, a copy of the kernel is placed at each x-position (along the horizontal axes of FIGS. 3A and 4A), and the kernel, in each case, is multiplied by the corresponding y-value. FIGS. 3A (linear) and 4A (cubic) show these scaled and positioned kernels superimposed on one another (but not summed). Referring to FIG. 3A, it is noted that because the linear kernel has a "support" (that is, width) of 2 pixels, two adjacent kernels overlap at any given point, except at integer values of x, where a single kernel contributes the entirety of the result.

The sum of these scaled and positioned linear kernels is shown in FIG. 3B, which illustrates the equivalency of the illustrated method to linear interpolation. One disadvantage of linear kernels arises from the fact that the derivative is not continuous at integer positions, resulting in sharp bends at the sample values, and straight lines between them.

Figure 4A:
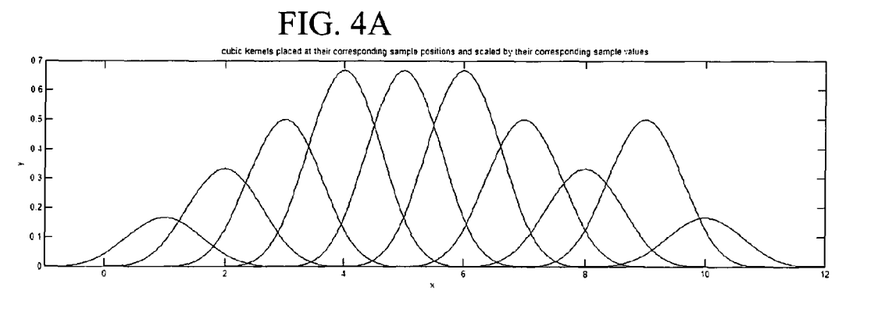
FIG. 4A is a plot of a plurality of cubic kernels placed at corresponding sample positions and scaled by their corresponding sample values.
Figure 4B:
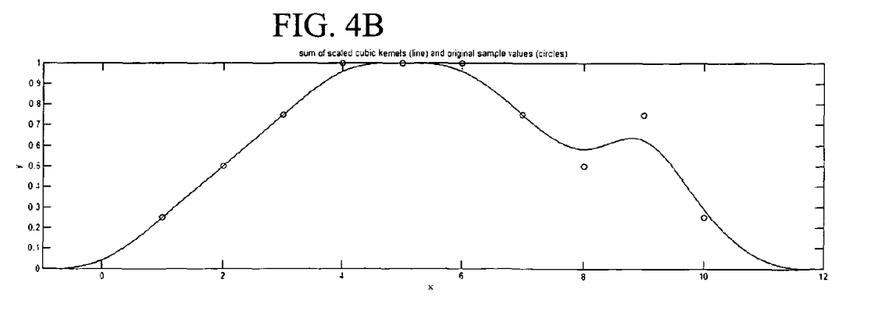
FIG. 4B is a plot of the sum of the cubic kernels shown in FIG. 4A.

The cubic kernel of FIGS. 4A and 4B may be supported by four kernels along each linear direction. Thus, in general, four kernels may overlap at a given point (except at integral points, where only 3 kernels contribute to the result). FIG. 4A shows a plurality of separately positioned, scaled cubic kernels within the same graph. FIG. 4B shows the sum of the scaled and positioned kernels of FIG. 4A.

The cubic kernel is smooth and has broader support than the linear kernel, which results in a higher order of continuity. Viewing the output curve of FIG. 4B, it is not obvious where within this curve the original discrete points were located. The cubic kernel shown is a B-spline, with B=1 and C=0. A side effect, however, is that the curve of FIG. 4B may not pass through all of the original points (peaks of the respective cubic kernels) illustrated in FIG. 4A. Thus, the interpolating curve may be somewhat "blurred".

In two dimensions, the kernels shown become two-dimensional functions, and can be drawn as "splats". Explicitly adding up scaled kernels with the CPU (Central Processing Unit) is not normally a computationally efficient way to calculate the interpolated function. However, graphics hardware acceleration allows the splat to be loaded as a texture map and added into the frame buffer 628 (FIG. 6) as a fast texturing operation. Hence with hardware acceleration, low-resolution and extremely high-quality blurred rendering can be achieved at low computational cost to the CPU 602, with the computational burden largely shifted to the graphics hardware, or GPU 618.

To better illustrate the processing-time concern, it is noted that the CPU running time for upsampling an image is typically proportional to the number of pixels in the final image. Thus, for example, upsampling a 16×16 image to have a resolution of 1600×1600 requires 2,560,000 separate CPU operations. In contrast, when using the splatting technique, the CPU preferably need only perform 16×16=256 operations, which preferably uses one ten thousandth as much time as rendering the entire image with CPU operations alone.

In existing systems, hardware-accelerated resampling involves loading the original image into specialized memory, called the "texture cache", and performing "texture mapping" operations which result in the linear interpolation of this cached image for final rendition on the display.

One or more embodiments of the present invention may be optimized for the case where the resolution of a resulting image is much higher than the resolution of the original image. In this case, the image of the bicubic kernel, as above, can be loaded into the texture cache. The kernel can then be added into the frame buffer at all of the positions corresponding to original image sample centers, at the appropriate scale and weighted by each image sample's corresponding intensity and/or color. In one or more embodiments, the kernel may correspond to a "splat". In one or more other embodiments, the kernels that have been weighted and/or scaled correspond to "splats." In essence, each "texel" (texture pixel, or original image sample) is drawn independently, using the kernel itself as the texture.

Similar techniques, often referred to as "splatting", have been used previously for the interactive rendition of volumetric data. The term "splatting", as applied to volume rendering, generally involves sorting the "voxels" (for "volumetric pixels", or three-dimensional point primitives) from back to front, then drawing a splat on the computer display at the location of each voxel in turn. Herein, the term "splatting" generally corresponds to a drawing technique in which the primitive elements drawn are points (in our case, corresponding to original image samples) instead of lines or polygons. The points are preferably drawn on the display as splat images, and in the application contemplated herein, these splat images may be interpolating kernels.

Because hardware graphics architectures allow very rapid repeated additive drawing of the kernel image, splatting can be a highly efficient method for image resampling when the magnification factor is high and dedicated graphics hardware is used for splatting.

In one or more embodiments, the splatting technique may include the ability to composite multiple images additively. The basic splatting algorithm is itself additive, in that every splat may add its brightness to the frame buffer. Moreover, in one or more embodiments, neighboring splats may overlap one another, and in such areas of overlap, the contributions of the overlapping splats are preferably summed to obtain the final brightness and/or color for the pixel concerned. If multiple images are to be rendered, then their splats will also overlap, resulting in correct additive blending of the images.

A two-dimensional splatting technique in accordance with one or more embodiments of the present invention may offer one or more of the features listed below.

In one or more embodiments, the resampling quality throughout the image, including the interior and the edges, is bicubic, which is superior to the quality provided using bilinear interpolation.

In one or more embodiments, because the graphics hardware is responsible for additively blending a plurality of texture images (here splats), the CPU may avoid having to perform the resampling function in software, thereby providing a substantial savings in computational expense.

In one or more embodiments, images with spatially-varying transparency are easy to render, since different splats need only be given different blending weights. For the special case where parts of the original image are fully transparent, the splats corresponding to those transparent parts may simply be skipped.

In one or more embodiments, since the graphics hardware can, at no cost to the CPU, use its accelerated bilinear resampling to scale up splats, the splats' texture sizes can be much smaller than their respective final footprints on the display. Because each splat is so smooth, bilinear resampling can scale up a small splat image with little degradation in quality.

In one or more embodiments, deforming the splat (which be may a hardware-accelerated operation) can produce images with high-quality anisotropic scaling, perspective transforms, or other warping effects, including even space-varying deformations.

In one or more embodiments, resampling may provide high resolution imaging at the image edges, yielding "fuzzy edges" which may provide a desirable photorealistic appearance in combination with other pre-existing content in the frame buffer. FIGS. 5C and 5D illustrate the effects of fuzzy edges.

One drawback of splatting in comparison with standard techniques is that if the original image is of substantial resolution, and is to be scaled up only slightly for display, then an inordinate number of splats might have to be drawn, making performance unacceptable. Fortunately, ordinary bilinear texture mapping is reasonably effective in dealing with images already having substantially high resolution. Hence, the two strategies (splatting and bilinear texture mapping) may be employed in a complementary manner. When an image is to be scaled down or scaled up only slightly, ordinary bilinear texture mapping can be used. However, when magnifying to an extent above some threshold magnification factor (such as, but not limited to 4), two-dimensional splatting may be beneficially employed.

In one or more embodiments, a combination of traditional bilinear texture mapping and splatting may be used where intermediate levels of magnification are sought. If an image is to be scaled up by an amount that doesn't justify the use of splats for all texels, yet by a large enough amount that edges of the image may appear "fuzzy" after being magnified, then splats could be used for the edges of the image, while the image interior may be rendered using standard bilinear interpolation.

In one or more embodiments, the edge splats may be modified to practice the above-described hybrid technique. Because splats have a support of four samples (pixels) in each direction, a four-sample margin of original image samples around the image edges could be rendered as splats. Following this approach, the outer splats are preferably rendered whole (that is, without truncation). Splats located one row or column in from the outer edge of the image may be truncated by one sample in the interior direction. Splats located two rows in from the outer edge of the image may be truncated by two samples. Splats located three rows in from the outer edge of the image may truncated by three samples. "Corner splats"

may be located at the respective image corners, and these corner splats may be truncated in both axes.

If desired, edge splats for an image can be combined ahead of time into a plurality of (such as four) upsampled edge textures with alpha channels. In this embodiment, the totality of an image's edge splats are combined to produce a total of four edge textures with associated alpha channels. Each alpha channel may be three image samples wide. The width of each alpha channel in image samples can be greater than three, but need not be the full eventual upsampled size. These edge textures can be calculated using standard bicubic magnification algorithms, giving a result equivalent to summed splats but with reduced computational burden.

In one or more embodiments, another refinement may be added for situations in which the magnification factor is above a magnification threshold, such as 4, yet where it is still desirable to avoid rendering the entire image as splats. In this case, an intermediate texture map can be generated by upsampling the original image to an intermediate resolution either bicubically or bilinearly using standard upsampling algorithms. This texture map can then be used to render the image interior, where, as before, it will be upsampled bilinearly by the graphics hardware.

In one or more embodiments, two bilinear upsamplings in sequence (e.g. each by factors of the square root of "5" (sqrt (5)) may produce a better result than a single bilinear upsampling, in this example, by a factor of 5, as can be demonstrated using the central limit theorem. From this theorem it follows that repeated resampling will cause the resampled image to converge toward Gaussian resampling. The use of bicubic resampling for the successive upsampling operations may produce better results than those obtained employing a succession of bilinear resampling operations.

A final twist on this algorithm is to produce intermediate texture maps with an alpha channel (like the splats themselves) which cover the area of the original image in addition to a 3-sample margin at each edge, scaled up by an intermediate amount. These intermediate texture maps resample the original image, as well as explicitly calculating the fuzzy edges using bicubic resampling and the alpha channel. They can then be upsampled the rest of the way by the graphics hardware (such as a graphics processor) for display. If an image is static (i.e. unchanging over time) and will be rendered at a variety of continuously-variable magnifications, then these explicitly upsampled images can be used as part of a multiresolution or "mipmap" pyramid (See Lance Williams, "Pyramidal Parametrics", SIGGRAPH 1983, which is incorporated herein by reference). If the image is to be stretched by an amount greater than the most expanded layer in the pyramid, then mipmap rendition can be parametrically blended with splat rendition, allowing a continuous transition.

Herein, a number of image scaling strategies have been described, ranging from conventional bilinear resampling to fully 2D splat-based rendition, which can form a continuum depending on the scaling factor by which an image is to be stretched. By using blending analogous to mipmapping (sometimes called "trilinear interpolation"), these techniques can dovetail for efficient real-time performance as well as exceptional visual quality at all scales. The table below is provided as a convenient reference with several exemplary transition values, but note that the actual scaling factors at which the different strategies are implemented may vary, and one or more embodiments of the invention may be applied using only a subset of these strategies.

| suggested scale range (s > 1 → magnification) | Strategy |
| --- | --- |
| 0 < s < 1.5 | conventional bilinear interpolation in hardware, possibly combined with conventional mipmapping for s < 1 |
| 1.5 < s < 3 | conventional bilinear interpolation for the image interior, and edge textures for the edges; and/or |
| 1.5 < s < 5 | expanded image textures using intermediate bilinear or bicubic resampling of the image interior, and bicubically-calculated edges with space-varying alpha for "fuzziness" |
| 4 < s < 10 | splats for edges, and intermediate bicubic resampling for image interior |
| 10 < s | splats for all image samples |

Figure 5A:
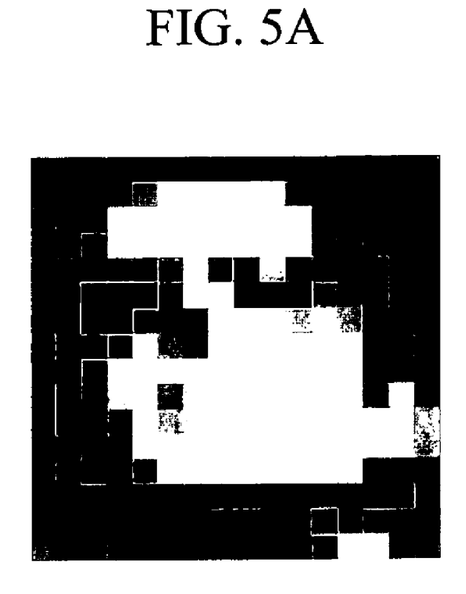
FIG. 5A is an original low-resolution image shown using a 16×16 pixel rendition.
Figure 5B:
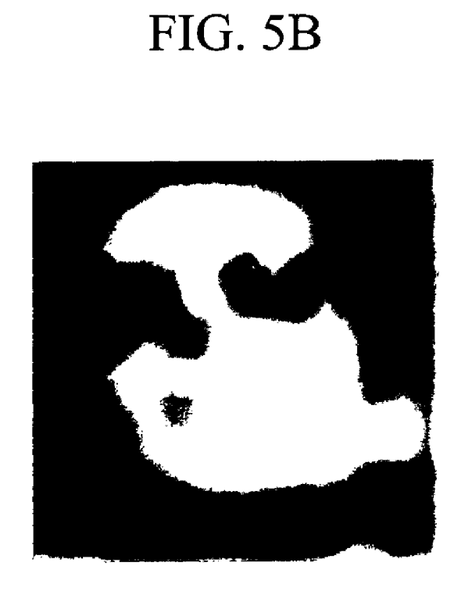
FIG. 5B is a version of the image of FIG. 5A that has been upscaled using bilinear interpolation as implemented by hardware-accelerated texture mapping in accordance with one or more embodiments of the present invention.
Figure 5C:
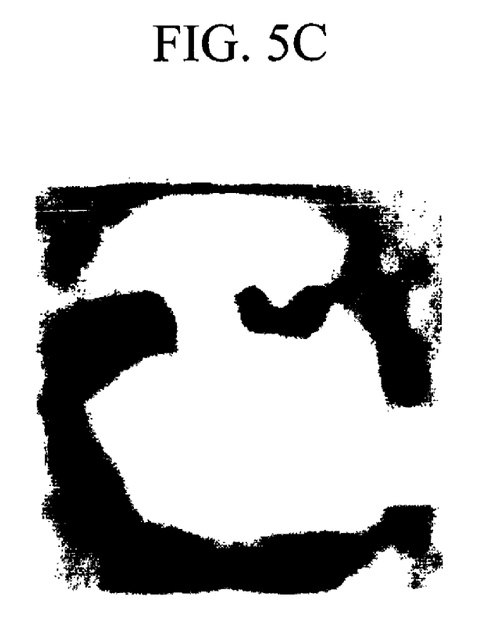
FIG. 5C is a version of the image of FIG. 5A that has been upscaled using a hybrid technique including the use of bilinear interpolation for the image interior and the use of splats for the edges of the image in accordance with one or more embodiments of the present invention.
Figure 5D:
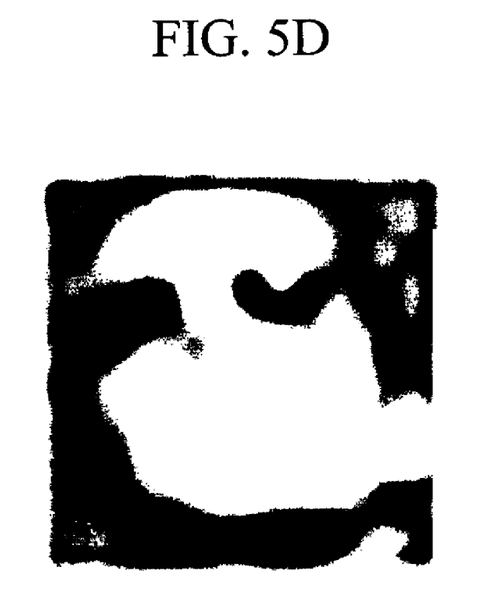
FIG. 5D is a version of the image of FIG. 5A that has been upscaled using splats for the entire image, resulting in bicubic interpolation, in accordance with one or more embodiments of the present invention.

FIG. 5A is an original low-resolution image shown using a 16×16 pixel rendition. FIG. 5B is a version of the image of FIG. 5A that has been upscaled using bilinear interpolation as implemented by hardware accelerated texture mapping in accordance with one or more embodiments of the present invention. It is noted that the image of FIG. 5B includes hard edges.

FIG. 5C is a version of the image of FIG. 5A that has been upscaled using a hybrid technique including the use of bilinear interpolation for the image interior and the use of splats for the edges of the image in accordance with one or more embodiments of the present invention. The use of splats beneficially enables the provision of "fuzzy edges" as shown in the image of FIG. 5C.

FIG. 5D is a version of the image of FIG. 5A that has been upscaled using splats for the entire image, resulting in bicubic interpolation, in accordance with one or more embodiments of the present invention. It is noted that FIG. 5D also includes fuzzy edges.

Figure 6:
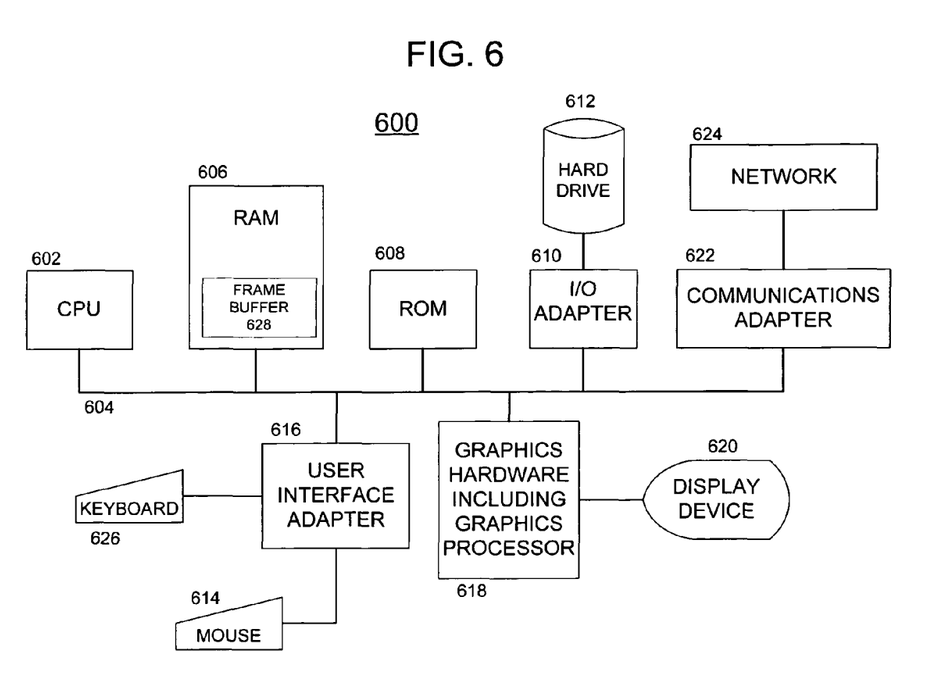
FIG. 6 is a block diagram of a computer system suitable for implementing one or more embodiments of the present invention.

FIG. 6 is a block diagram of a computing system 600 adaptable for use with one or more embodiments of the present invention. In one or more embodiments, central processing unit (CPU) 602 may be coupled to bus 604. In addition, bus 604 may be coupled to random access memory (RAM) 606, read only memory (ROM) 608, input/output (I/O) adapter 610, communications adapter 622, user interface adapter 606, and graphics hardware 618, which may include one or more graphics processors.

In one or more embodiments, RAM 606 and/or ROM 608 may hold user data, system data, and/or programs. RAM 606 may include frame buffer 628. While frame buffer 628 may be located within RAM 606, in one or more alternative embodiments, frame buffer 628 could be located elsewhere within computing system 600. For example, frame buffer 628 may be within, attached to, or in communication with, graphics hardware 618.

I/O adapter 610 may connect storage devices, such as hard drive 612, a CD-ROM (not shown), or other mass storage device to computing system 600. Communications adapter 622 may couple computing system 600 to a local, wide-area, or Internet network 624. User interface adapter 616 may couple user input devices, such as keyboard 626 and/or pointing device 614, to computing system 600. Moreover, display adapter 618 may be driven by CPU 602 to control the display on display device 620. CPU 602 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
a computing system having at least one CPU (Central Processing Unit) and at least one graphics processor, wherein said computing system is configured to:
provide an original image having an array of samples;
for each of the samples within a predefined sample margin of an outer edge of the original image, define each of the samples within the predefined sample margin as a splat in said target image;
render each of the samples defined as a splat employing the graphics processor and a splatting rendering technique resulting in edge splat samples;
for each of the samples outside the predefined sample margin of the outer edge of the original image, render an interior of the target image using bilinear interpolation resulting in interior samples;
combine the edge splat samples and the interior samples as the target image; and
present said target image comprised of each splat rendered using the splatting rendering technique and the interior of the target image rendered using the bilinear interpolation technique.

2. The apparatus of claim 1, wherein the predefined sample margin is a 3-sample margin.

3. The apparatus of claim 1, wherein the predefined sample margin is a 4-sample margin.

4. The apparatus of claim 1 wherein rendering each of the samples defined as a splat comprises calculating pixel values in said target image using a bicubic kernel.

5. The apparatus of claim 1 wherein rendering each of the samples defined as a splat comprises:
additively compositing texture images of each splat placed at respective centers of the original images and scaled by respective sample values of the images.

* * * * *